July 15, 1941.  H. E. DEGLER ET AL  2,249,285

AIR CONDITIONING UNIT FOR THE RELIEF OF HAY FEVER AND ASTHMA

Filed Oct. 7, 1939

Witnesses:

Willis R. Woolrich

Raymond F. Dawson

Inventor:

Howard E. Degler

Alvin H. Willis

Patented July 15, 1941

2,249,285

UNITED STATES PATENT OFFICE 2,249,285

AIR CONDITIONING UNIT FOR THE RELIEF OF HAY FEVER AND ASTHMA

Howard E. Degler and Alvin H. Willis, Austin, Tex., assignors to Board of Regents of The University of Texas, Austin, Tex.

Application October 7, 1939, Serial No. 298,446

1 Claim. (Cl. 126—110)

This invention relates to an improvement in air conditioning units for the relief of hayfever and asthma, and the object of this improvement is to provide a means for heating the filtered air before it is discharged from the machine.

Figure 1:
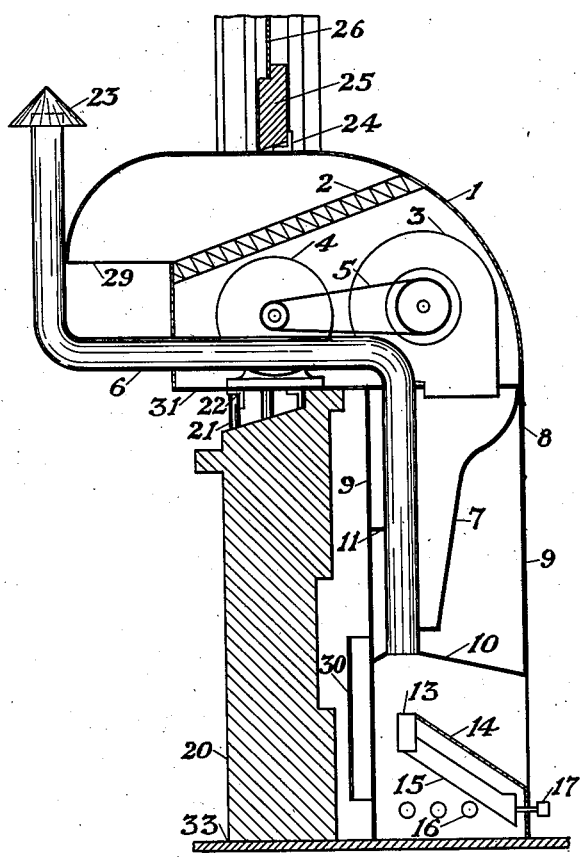
Figure 2:
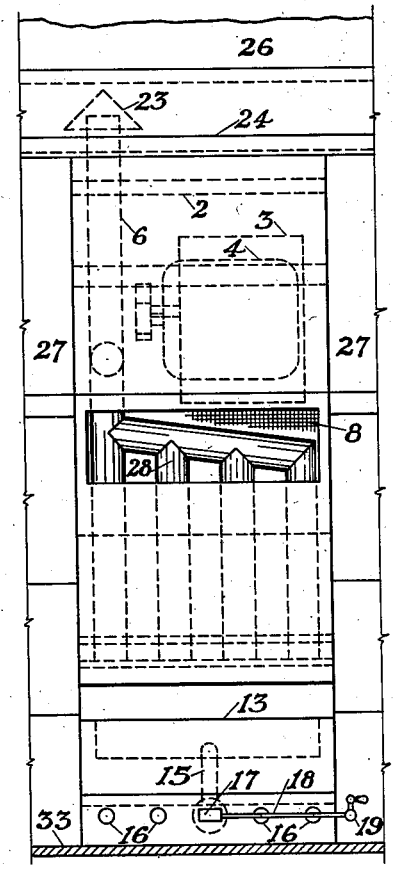

The following description covers the fan and filter unit and a heater using gas. The object is attained by the unit illustrated in the accompanying drawing in which Fig. 1 is a vertical section of the entire unit and Fig. 2 an elevation of the unit with the air baffle 7 removed thus showing the construction of the heat exchanger tubes 28.

The entire unit is built so that it will set on the floor 33 next to the outside wall 20, under the partially opened window 25 and 26, and is held in place by brackets 22 and 24 and support 21. The extra space between the unit and the window frame is filled by two panels 27 and 27.

The upper portion of the unit consists of a hood 1 supporting a filter 2 and covering a centrifugal blower 3 driven by an electric motor 4 and belt 5 all of which are mounted on base pan 31. The blower draws air through the opening 29 into the hood 1 and thence through the filter 2 and delivers it into the heater unit 9.

This type of heater using gas consists of a gas burner 13, which is supplied with gas through orifice 17, pipe 18, and valve 19, and air through holes 16. The air and gas mix in chamber 15. The burnt gases are directed into the heat exchanger tubes 28 by the baffle 10 where they give up heat to the filtered air being delivered from the blower, and from there they pass to the outdoors through exhaust tube 6. Bonnet 23 serves to keep rain out of the exhaust pipe 6.

The air being delivered from the blower 3 is directed over the outside of the heat exchanger tubes 28 by the air baffles 11 and 7 and thence out into the room through grille 8.

Baffle 30 serves to protect the wall against the heat created in the region of the gas burner 13.

A full discussion of the different types of hay fever and of allergy and hypersensitivity, biological aspects of hay fever, and tests of air conditioning units to relieve cedar-pollen hay fever is contained in our pamphlet published as Bulletin 3932, University of Texas.

Taking cedar pollen as a typical source of infection, this pollen is released into the atmosphere as a shrivelled, rough, dry particle, ranging from 18 to 20 microns in diameter and so light that it takes 150 million of these pollen grains to weigh a single gram. Altho the dry pollen grain might readily cause irritation of the mucous membranes of the nose, throat and lungs we believe the principal cause of hay fever is due to the absorption of the protein into the blood after enlargement of the pollen grain by coming into contact with moisture as for example in the usual air conditioning unit.

When wetted these pollen grains swell and the outside of the shell or exine bursts and leaves the protoplast in an unprotected condition so that its protein content is readily absorbed into the blood stream. We have found that a person allergic to pollen is more uncomfortable when subjected to cooled filtered air than if such patient is in the outside air. Our experiments clearly indicate that cooled air with only a little pollen in it causes greater irritation than warmed air containing a large quantity of pollen. In the device here illustrated and described a large portion of the pollen is filtered out and the pollen that is passed through the filter is rendered relatively harmless by the heating in the heat exchanger.

We claim:

In a device for the relief of hay fever, a hood adapted to project thru the window of a room to extend beyond the wall on both sides, a casing extending vertically downward from the hood, heating means at the bottom of the casing, a plurality of exhaust pipes extending upwardly from said heating means to form a heat exchanger within the casing, a filter within the hood, and a motor-driven blower located between the filter and the heat exchanger for causing a downward flow of filtered air around the exhaust pipes to build up within the room a positive pressure to cause an outward leakage thru the cracks and openings of the room.

HOWARD E. DEGLER.
ALVIN H. WILLIS.